US010219216B2

(12) United States Patent
Sorrentino et al.

(10) Patent No.: US 10,219,216 B2
(45) Date of Patent: Feb. 26, 2019

(54) REDUNDANT SCHEDULING INFORMATION FOR DIRECT COMMUNICATION

(71) Applicant: Telefonaktiebolaget L M Ericsson (PUBL), Stockholm (SE)

(72) Inventors: Stefano Sorrentino, Solna (SE); Stefan Wänstedt, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 836 days.

(21) Appl. No.: 14/409,387

(22) PCT Filed: Jan. 30, 2014

(86) PCT No.: PCT/SE2014/050117
§ 371 (c)(1),
(2) Date: Dec. 18, 2014

(87) PCT Pub. No.: WO2015/115945
PCT Pub. Date: Aug. 6, 2015

(65) Prior Publication Data
US 2016/0278009 A1    Sep. 22, 2016

(51) Int. Cl.
*H04W 52/02* (2009.01)
*H04W 72/02* (2009.01)
(Continued)

(52) U.S. Cl.
CPC ... *H04W 52/0216* (2013.01); *H04W 52/0229* (2013.01); *H04W 72/02* (2013.01);
(Continued)

(58) Field of Classification Search
CPC ............ H04W 72/02; H04W 72/1289; H04W 52/0216; H04W 8/005; Y02B 60/50
See application file for complete search history.

(56) References Cited

U.S. PATENT DOCUMENTS

2009/0109851 A1\* 4/2009 Li ..................... H04W 72/1231
370/235
2012/0320805 A1\* 12/2012 Yang ........................ H04L 1/18
370/280
(Continued)

FOREIGN PATENT DOCUMENTS

EP          2635082 A1    9/2013
JP         H5-145526 A    6/1993
(Continued)

OTHER PUBLICATIONS

Search Report and Written Opinion issued in corresponding international application No. PCT/SE2014/050117, dated Oct. 17, 2014.
(Continued)

*Primary Examiner* — Oussama Roudani
(74) *Attorney, Agent, or Firm* — Patent Portfolio Builders, PLLC

(57) ABSTRACT

Methods, apparatuses, and computer program products for direct communication between wireless devices. Techniques for transmitting multiple redundant scheduling assignments for the same data transmission are provided, as well as techniques detecting information using multiple redundant scheduling assignments.

59 Claims, 7 Drawing Sheets

(51) Int. Cl.
*H04W 72/12* (2009.01)
*H04W 8/00* (2009.01)
*H04W 76/14* (2018.01)

(52) U.S. Cl.
CPC ........ *H04W 72/1289* (2013.01); *H04W 8/005* (2013.01); *H04W 52/0241* (2013.01); *H04W 76/14* (2018.02); *Y02D 70/142* (2018.01); *Y02D 70/144* (2018.01); *Y02D 70/164* (2018.01); *Y02D 70/21* (2018.01); *Y02D 70/22* (2018.01); *Y02D 70/24* (2018.01)

(56) References Cited

U.S. PATENT DOCUMENTS

| | | | | |
|---|---|---|---|---|
| 2013/0107831 | A1* | 5/2013 | Han | H04W 72/00 370/329 |
| 2013/0258996 | A1 | 10/2013 | Jung et al. | |
| 2013/0322413 | A1 | 12/2013 | Pelletier et al. | |
| 2014/0119262 | A1* | 5/2014 | Park | H04W 4/06 370/312 |
| 2015/0245323 | A1* | 8/2015 | You | H04W 72/042 370/329 |

FOREIGN PATENT DOCUMENTS

| | | |
|---|---|---|
| JP | 2010-514291 A | 4/2010 |
| WO | 2008074380 A1 | 6/2008 |
| WO | 2010082084 A1 | 7/2010 |
| WO | 2014168536 A1 | 10/2014 |
| WO | 2015020602 A1 | 2/2015 |

OTHER PUBLICATIONS

Ericsson "Synchronization Signals and Channel Design for D2D Discovery and Communication" 3GPP TSG RAN WG1 Meeting #75, R1-135804, 2013, 9 pages.
International Preliminary Report on Patentability, issued in corresponding International Application No. PCT/SE2014/050117, dated Jan. 19, 2016, 22 pages.
Kim et al. "An Adaptive Connection Scheduling Method Based on Yielding Relationship in FlashLinQ" ICCSA, Part 1, LNCS 7971, 2013, pp. 121-130.
Extended European Search Report dated Aug. 7, 2017, issued in European Patent Application No. 14881032.8, 8 pages.
Ericsson "Synchronization Procedures for D2D Discovery and Communication" 3GPP TSG RAN WG1 Meeting #75, 2013, R1-135803, 6 pages.
3GPP, 3rd Generation Partnership Project; Technical Specification Group Services and System Aspects; Feasibility study for Proximity Services (ProSe) (Release 12), 3GPP TR 22.803 V12.2.0, 2013, 45 pages.
Japanese Office Action dated Dec. 8, 2017, issued in Japanese Patent Application No. 2016-548620, 7 pages.
Ericsson "D2D Scheduling Procedure" 3GPP TSG-RAN WG2 #84, Tdoc R2-134238, 2013, 7 pages.
Ericsson "On scheduling procedure for D2D" 3GPP TSG-RAN WG1 Meeting #76, R1-140778, 2014, 5 pages.
European Communication dated Apr. 3, 2018, issued in European Patent Application No. 14881032.8, 5 pages.

* cited by examiner

REDUNDANT SCHEDULING INFORMATION FOR DIRECT COMMUNICATION

CROSS REFERENCE TO RELATED APPLICATION(S)

This application is a 35 U.S.C. § 371 National Phase Entry Application from PCT/SE2014/050117, filed Jan. 30, 2014, designating the United States, the disclosure of which is incorporated herein in its entirety by reference.

TECHNICAL FIELD

This disclosure relates generally to wireless communication and, more particularly, to methods, devices, and computer program products for direct communication between wireless devices.

BACKGROUND

Device discovery is a well-known and widely used component of many existing wireless technologies, including ad hoc and cellular networks. Examples of technologies and/or standards, in which device discovery is used, include Bluetooth and several variants of the Institute of Electrical and Electronics Engineers (IEEE) 802.11 standards suite, such as WiFi Direct. These systems operate in unlicensed spectrum.

Recently, device-to-device (D2D) communications as an underlay to communications in a cellular network have been proposed as a way to take advantage of the proximity of communicating devices, while at the same time allowing devices to operate in a controlled interference environment. Typically, such D2D communications share the same spectrum as the cellular network. For instance, some resources of the cellular network's uplink resources may be reserved for D2D communication. Allocating a dedicated spectrum for D2D communication is a less likely alternative, as spectrum is a scarce resource and dynamic sharing between services utilizing D2D communication and cellular is more flexible and provides higher spectrum efficiency.

Devices that want to discover and/or communicate will typically need to transmit various forms of control signaling. One example of such control signaling is the so-called (discovery) beacon signal, which carries some form of identity and is transmitted by a device that wants to be discoverable by other devices. The other devices can scan for the beacon signal, and once they have detected the beacon, take the appropriate action. For example, a device may try to initiate a connection setup with the device transmitting the beacon. For certain communication modes (e.g., connectionless communication, often employed for groupcast and broadcast transmission), the beacon signal may carry information that indicates associated data transmission to potential receivers. Connectionless communication is typically a unidirectional communication mode that does not require acknowledged connection setup.

The 3GPP feasibility study for Proximity Services ("ProSe") recommends also supporting D2D operation for out of network coverage user equipments (UEs). In such a case, different synchronization options are possible. For example, UEs may synchronize to a global reference (e.g., a GPS) that is in general different from the synchronization reference of deployed networks. Also, UEs may operate in a fully asynchronous fashion (i.e., no synchronization reference, at least for discovery). A further option is that clusters of UEs synchronize to a specific UE (referred to as Cluster Head (CH)), which provides local synchronization to its neighboring UEs. Different clusters are not necessarily synchronized.

If out of network coverage synchronization is based on sync signals transmitted by Cluster Heads, it is necessary that UEs synchronize to the suitable synchronization reference (CH). A number of procedures may be considered, with some similarities to cell search in cellular networks where idle UEs search for sync signals from different cells and synchronize to, e.g., the cell with best signal strength. Similarly, ProSe-enabled out of network coverage UEs might synchronize to the strongest Channel Head in the proximity.

In some cases, wireless devices reduce power consumption by alternating awake and sleep cycles, which is referred to as discontinuous reception (DRX). During the sleep periods, only the memory and clocks are active and the wireless device is unable to receive any signal. During an awake time, the receiver is on, and the device may be configured to monitor for any control messages. It is often essential that the awake time be set as narrow/infrequent as possible as compared to the sleep time in order limit battery use.

SUMMARY

Aspects of the present disclosure are directed to transmitting multiple redundant scheduling assignments for the same data transmission, thereby maximizing the probability of detection and minimizing scheduling latency and unreliability.

In some embodiments, a method for direct communication between wireless devices is provided. The method includes transmitting, directly from a first wireless device to a second wireless device, a first scheduling cycle. The method also includes transmitting, directly from the first wireless device to the second wireless device, a first set of data to be detected by the second wireless device, where the first scheduling cycle includes a plurality of redundant scheduling assignments each indicating to the second wireless device the first set of data.

In some embodiments, a method for detecting information communicated directly between wireless devices is provided. The method includes receiving, at a first wireless device from a second wireless device, a first redundant scheduling assignment. The method also includes receiving, at the first wireless device from the second wireless device, a second redundant scheduling assignment, where the first and second redundant scheduling assignments are each associated with a data transmission from the second wireless device. A set of data from the data transmission is detected using said first and/or second redundant scheduling assignments.

In some embodiments, a wireless device is provided that is configured to provide direct communication to another wireless device, and includes a processor and a memory. The memory contains instructions executable by the processor, such that the wireless device is operable to directly transmit to a second wireless device a first scheduling cycle. The wireless device is also operable to directly transmit to the wireless device a first set of data to be detected by the second wireless device, where the first scheduling cycle includes a plurality of redundant scheduling assignments each indicating to the second wireless device the first set of data.

In some embodiments, a wireless device includes a processor and a memory, where the memory contains instructions executable by the processor such that the wireless device is operative to receive from a second wireless device a first redundant scheduling assignment. The wireless device is also operable to receive from the second wireless device a second redundant scheduling assignment, where the first and second redundant scheduling assignments are each associated with a data transmission from the second wireless device. The wireless device is further operable to detect a set of data from the data transmission using said first and/or second redundant scheduling assignments.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Particular embodiments are directed to methods, devices, and computer program products for direct communication between wireless devices.

Figure 1:
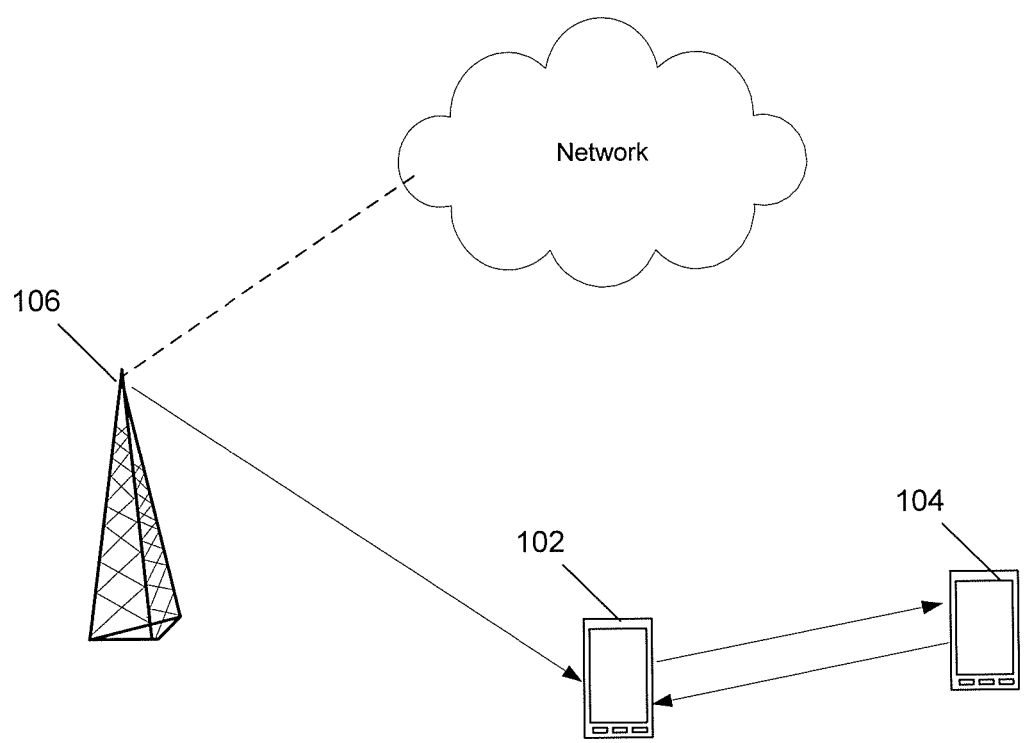
FIG. 1 is an illustration of a wireless network in accordance with exemplary embodiments.

FIG. 1 illustrates an example wireless network 100. As shown, wireless network 100 includes at least one radio node 106 and at least one wireless communication device (WCD) 102,104. Examples of WCDs include, but are not limited to, mobile telephones, user equipments (UEs), personal digital assistants, electronic readers, portable electronic tablets, wireless sensors, machine communication devices, personal computers, and laptop computers. The radio node 106 may be, for instance, configured to transmit and receive radio signals, and to control one or more devices (such as WCDs 102,104). In some embodiments, radio node 106 may be a radio network node (e.g., a base station) or relay node that provides radio coverage for its respective cell. In some embodiments, the radio node 106 may be a cluster head or similar device used to control timing reference for one or more devices.

According to certain aspects, one or more of WCDs 102 and 104 may be a DRX device. That is, one or more of WCDs 102 and 104 may alternate between an "awake" state and a "sleep" cycle, for instance, to reduce power consumption. As such, during its respective awake state or sleep cycle, a WCD 102,104 may or may not be able to receive signals, including monitoring for control signaling.

A wireless device, such as WCD 104, may be configured with a DRX schedule that minimizes its awake time, i.e., the time where the receiver of WCD 104 is active in order to search and detect signals or channels of interest. This may be implemented, for example, by designing a system where transmissions of interest for a given WCD may only occur at specific time instances. The WCD 104 would thus be able to perform large DRX cycles, i.e., "sleep" for long periods of time and only "wake up" occasionally to monitor incoming transmissions at the expected reception time. Since D2D is required to work in multi-cell deployments (including the case of unsynchronized deployments), WCDs, such as UEs, are expected to wake up at least at time instances corresponding to discovery resources, possible in multiple cells or multiple synchronization references. Such discovery resources and time locations may be acquired by the WCDs 102,104 or signalled by the network 100 or other nodes 106, if available. However, because discovery resources may not be not aligned for different cells, or even within a cell, not all WCDs 102,104 will monitor all discovery resources at the same time, especially considering a multi-cell deployment (or out of network coverage scenario). Moreover, a WCD102,104 may not be able to receive certain resources due to other restrictions, such as an inability to simultaneously transmit and receive on the same resources. For example, WCD 104 may miss control information communicated on a given resource because it was transmitting on the same resource at the time the control information was sent.

As recognized herein, a problem with such implementations is that discovery resources are quite sparse in time (for DRX cycles maximization) and WCD104 may frequently be in a sleep cycle during transmission or otherwise prevented from receiving information, and thus, it may not be possible to meet necessary latency requirements on discovery. When scheduling assignments for direct communication are transmitted over discovery resources, for instance, where a scheduling assignment is followed by data transmission, the associated reliability and latency may not be sufficient to fulfill a given service requirements. There is a need for methods, devices, and computer program products to efficiently support direct D2D communication with relatively limited impact on the existing specifications and WCD implementation, including the introduction of connectionless communication modes where WCDs 102,104 do not need to explicitly set up a data channel in order to exchange data, yet latency and reliability requirements can be met.

According to some embodiments, techniques are provided for reducing latency and improving reliability of scheduling assignments for direct communication. Redundancy in the scheduling assignments may be created by transmitting multiple scheduling assignments, for instance, from WCD 102, for the same data communication session, such that the probability is increased that an interested receiver, such as WCD 104, will detect at least one scheduling assignment within its awake window. A scheduling assignment provides control information related to scheduling. For instance, a scheduling assignment may provide, in some cases, information regarding the pattern, format, frequency, and size of an associated data transmission (i.e., a mapping to the associated data transmission). A scheduling assignment could also, for example, provide information regarding one or more of the identity of the transmitting device (e.g., WCD 102), the identity of an intended receiving device (e.g., WCD 104), and data content or type.

Figure 2:
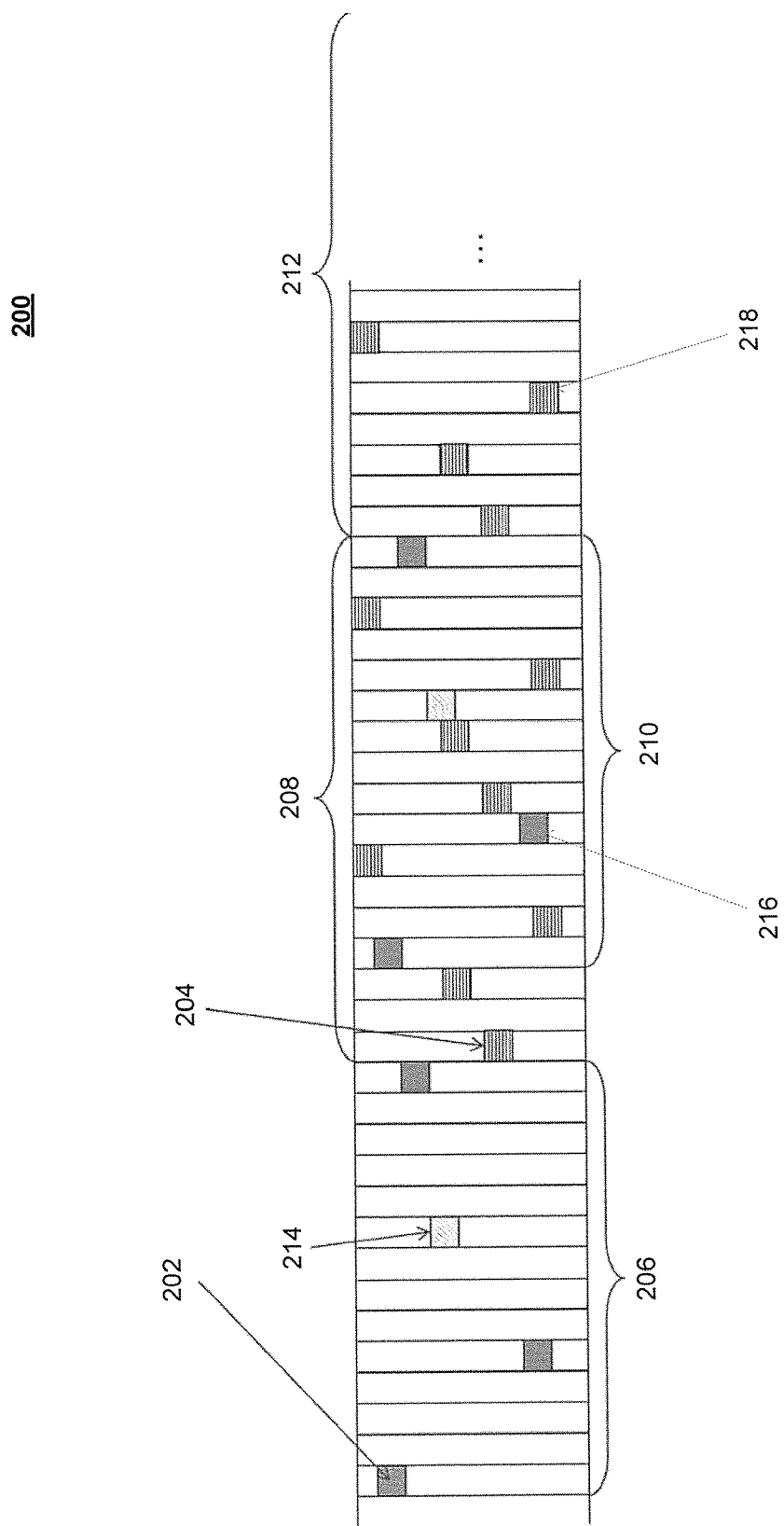
FIG. 2 is an illustration of wireless device transmissions in accordance with exemplary embodiments.

Referring now to FIG. 2, an illustration of a wireless device's transmissions 200, such as, transmission from WCD 102, is provided. In some embodiments, the transmissions 200 may include a first scheduling assignment cycle 206, a first data transmission pattern 208, a second scheduling assignment cycle 210, and a second data transmission pattern 212. Within each of the scheduling assignment cycles 206 and 210, redundant scheduling assignments are transmitted. For instance, within the first cycle 206, redundant scheduling assignments 202 are transmitted. Similarly, a second set of redundant scheduling assignments 216 are transmitted in the second cycle 210. A scheduling assignment cycle may include one or more scheduling assignment gap (or drop) resources 214. Within the data transmission patterns 208 and 212, first and second sets of data 204 and 218 a transmitted, respectively.

According to some embodiments, the redundant scheduling assignments 202 of the first cycle 206 are associated with the first data transmission 208 and set of data 204, while the redundant assignments 216 of the second cycle 210 are associated with the second data transmission 212 and set of data 218. Thus, information may be communicated directly from WCD 102 to WCD 104, where the redundant scheduling assignments 202 indicate to the receiving WCD 104 the first set of data 204. Because the scheduling assignments are transmitted redundantly for a given data transmission, if a receiving device fails to detect an assignment, for instance because it is in a sleep cycle or otherwise unable to receive a given resource, it may still detect one of the redundant scheduling assignments, thereby indicating the transmitted data and enabling detection.

Figure 3:
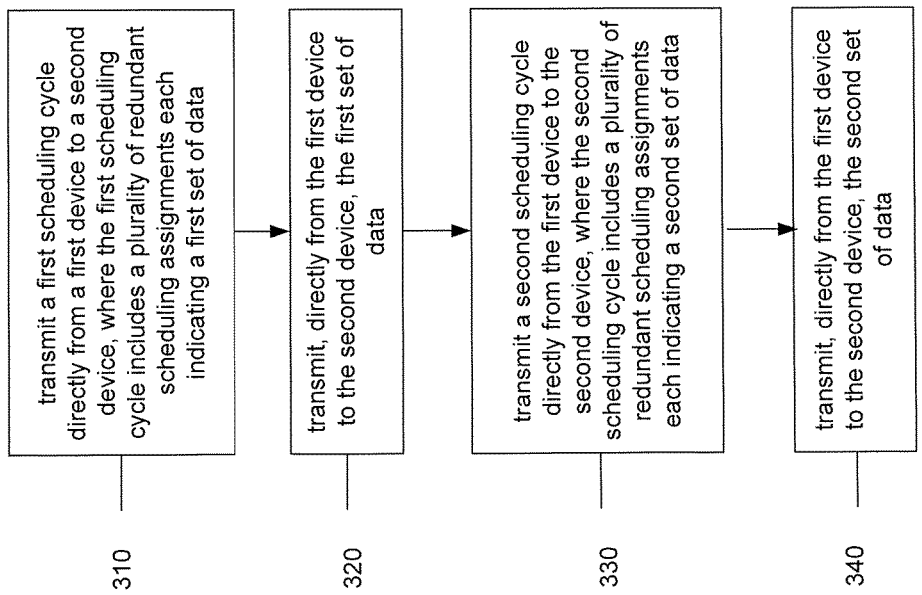
FIG. 3 is a flow chart illustrating a direct communication process in accordance with exemplary embodiments.

Referring now to FIG. 3, a process 300 for direct communication between wireless devices is provided. The communication may be, for example, the direct communication of data between WCD 102 and WCD 104.

In step 310, a wireless device, such as WCD 102, transmits a first scheduling cycle. The first scheduling cycle may be transmitted, for instance, directly to all proximate wireless devices, including WCD 104. In some embodiments, the scheduling cycle includes a plurality of redundant scheduling assignments that are each associated with a first set of data. For instance, the scheduling assignments may be associated with the same data packet, data channel or data communication session, such as the first data transmission pattern 208 and data 204 illustrated in FIG. 2. In some embodiments, the redundant scheduling assignments may schedule a set of data resources (multiple packets in time and/or frequency domain). The redundant scheduling assignments indicate to the second wireless device the first set of data. According to certain aspects, the scheduling assignments may be multiplexed into specific sub-frames or resource pools that receivers, such as WCD 104, need to monitor regularly.

The multiple scheduling assignments, such as the scheduling assignments 202 of the first scheduling assignment cycle 206, are redundant because it would be sufficient to detect only a subset of them to be able to find and decode (i.e., detect) the associated data communication. According to some embodiments, the redundancy may be achieved in a number of ways.

For example, in some embodiments, each of the scheduling assignments 202 can include a pointer to the spectrum resources of the associated data transmission 208 and data 204. The pointer may include, for example, a predetermined time or frequency offset of the data relative to the scheduling assignment. In some embodiments, each of the scheduling assignments may include a time or frequency offset indicator pointing to the resources of the synchronization signals associated to the data transmission 208 and data 204. In certain aspects, each scheduling assignment may be self-contained.

In some embodiments, the position of resources for associated data transmission may be derived (directly or implicitly) from the resources of the scheduling assignment. The position may be determined, for example, according to a predefined rule. The rule may be known to one (or both) of the receiving and transmitting devices 102,104. For instance, the rule may describe how WCD 104 should use a received scheduling assignment 202 to detect data 204. In some cases, the rule for obtaining the resource allocation for data transmission could be as a function of the time and/or frequency position of the scheduling assignment and an index of the scheduling assignment retransmission within the cycle. For example, in the case where the same content is transmitted by multiple scheduling assignments in a cycle, a different redundancy version may be used for each retransmission. The employed redundancy version may be a function of the resources used for the scheduling assignment (e.g., the retransmission index). The index of the scheduling assignment retransmission could be included, for example, in the scheduling assignment payload. In some embodiments, if the scheduling assignment payload is different at each retransmission (e.g., different index), a soft combination of the whole payload received across multiple transmissions may not be possible. The time position of synchronization signals might alternatively be implicitly derived from the time resource of the data transmission according to predefined rules.

In some embodiments, the rule for obtaining the resource allocation for data transmission could be a function of the time and/or frequency position of the scheduling assignment. In embodiments where the scheduling assignment payload is the same at each retransmission within the cycle, a soft combination of the whole payload from multiple scheduling assignments may be possible at the receiver. However, as described above, it may be sufficient that the receiver receives only a subset of the redundant scheduling assignments (including just one) in order to be able to detect the payload of the scheduling assignment and find the associated data transmission. Also, one of ordinary skill in the art will recognize that the above redundancy methods may be used singularly or used in combination.

In some embodiments, the transmitting device (e.g., WCD 102) may transmit only a limited number of redundant scheduling assignments. For example, WCD 102 may determine a plurality of candidate redundant scheduling assignments, but only transmit a subset of the candidates. The selection of a subset may be based, for instance, on an autonomous decision of WCD 102 or based on predefined patterns.

In step 320, the wireless device transmits the first set of data. For instance, WCD 102 may transmit data directly to WCD 104, wherein WCD 104 can use the information of one or more of the redundant scheduling assignments transmitted in step 310 to detect the data. According to some embodiments, the transmission of the scheduling assignments and data are configured according to detection rules known to both WCD 102 and 104.

In step 330, the wireless device, such as WCD 102, transmits a second scheduling cycle. The second scheduling cycle may be transmitted, for instance, directly to all proximate wireless devices, including WCD 104. In some embodiments, the second scheduling cycle includes a plurality of redundant scheduling assignments that are each associated with a second set of data. The redundant scheduling assignments indicate to the second wireless device the second set of data. In some embodiments, the transmission of the second scheduling cycle may be overlapping in time with the first data transmission. For example, the second cycle 210 and first data transmission 208 overlap in the illustration of FIG. 2.

In step 340, the wireless device transmits the second set of data. For instance, WCD 102 may transmit data directly to WCD 104, wherein WCD 104 can use the information of one or more of the second set of redundant scheduling assignments transmitted in step 330 to detect the second set of data.

Figure 4:
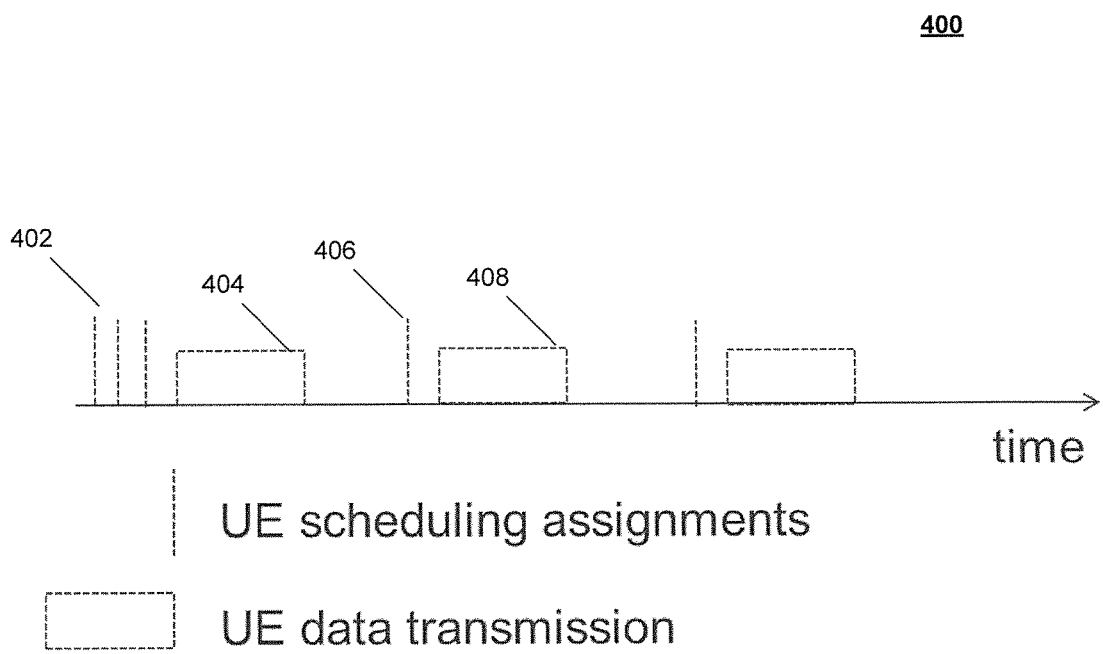
FIG. 4 is a flow chart illustrating a direct communication process in accordance with exemplary embodiments.

In some embodiments, the number of redundant scheduling assignments transmitted from the first device is larger for the first packet (or set of packets) for a data communication than it is for subsequent transmission of the communication. In some instances, fewer or only one scheduling assignment is transmitted for each consecutive packet for the same data session. For example, as shown in FIG. 4, multiple scheduling assignments 402 may be used for packet(s) 404, whereas only one scheduling assignment 406 is used for packet(s) 408 in the data session 400. However, exceptions may be applied if the data communication session has a relatively long inactivity time, in which case a longer train of scheduling assignments may be used to resume the data communication session.

In some embodiments, if a device, such as WCD 102, is aware of the resources used for discovery or scheduling assignments in one or multiple cells (or synchronization clusters), then the scheduling assignments may be transmitted at time instances corresponding to a subset of such discovery resources.

Figure 5:
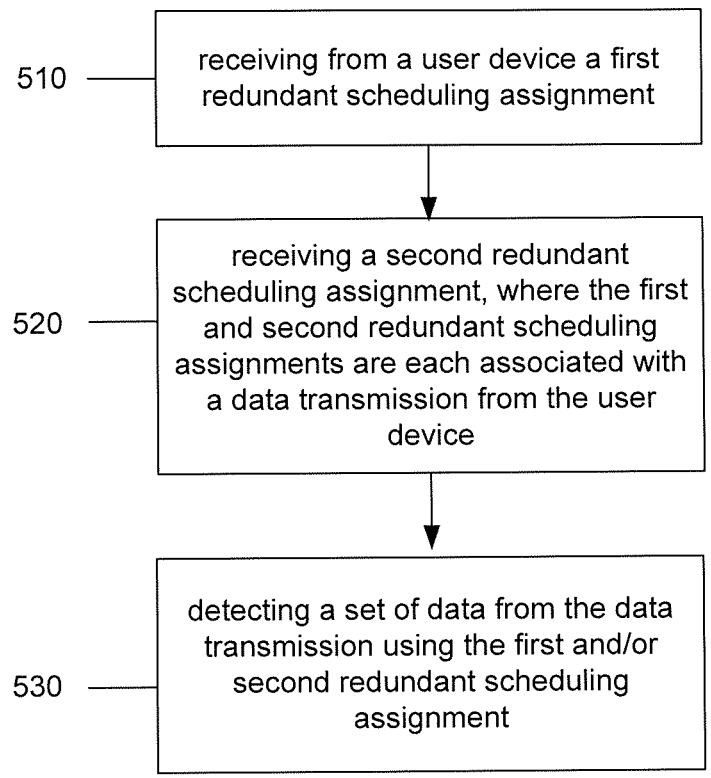
FIG. 5 is a flow chart illustrating a direct communication process in accordance with exemplary embodiments.

Referring now to FIG. 5, a process 500 for detecting information communicated directly between wireless devices is provided. The process may be applied, for instance, to D2D communication between WCDs 102 and 104.

In step 510, a first redundant scheduling assignment is received at a first wireless device from a second wireless device. For instance, WCD 104 may receive a first redundant scheduling assignment from WCD 102, such as a first assignment of scheduling assignment cycle 206.

In step 520, a second redundant scheduling assignment is received at the first wireless device from the second wireless device, where the first and second redundant scheduling assignments are each associated with a data transmission for the second wireless device. For instance, the WCD 104 may receive a second redundant scheduling assignment from WCD 102, such as a second assignment of scheduling assignment cycle 206. In this example, the received redundant scheduling assignments are associated with data transmission pattern 208. In some embodiments, the received redundant scheduling assignments may indicate at least one of identify of the first wireless device, identity of the second wireless device, and the content or type of the data set. They may also identify at least one of a pattern of the corresponding data set, a format of the data set, a frequency of the data set, and size of the data set.

In some embodiments, the redundant scheduling assignments may include a pointer to a spectrum resource of the data transmission, or the time or frequency position of a spectrum resource of the data transmission may be indicated by a time or frequency position of one or more of said redundant scheduling assignments. In some instances, the redundant scheduling assignments may be offset by a pre-determined time offset or a frequency offset relative to the data transmission. According to some embodiments, the receiving device, such as WCD 104, is able to interpret the scheduling assignments according to previously established rules. These rules may be known, for instance, to both the transmitting and receiving devices.

In step 530, the first wireless device, such as receiving WCD 104, uses one or more of the scheduling assignments 202 to detect the data of the data transmission, such as data 208. As described above, each redundant scheduling assignment should be sufficient to detect the data. However, in some embodiments, if the payload is the same at each retransmission within the cycle 206, a soft combination of the whole payload from multiple scheduling assignments 202 may utilized by the receiver. In some embodiments, if multiple scheduling assignments referring to the same data are received, the wireless device may rely on the most recent one.

In some embodiments, the first wireless device may receive third and fourth redundant scheduling assignments from the second wireless device, where the third and fourth redundant scheduling assignments are associated with a second data transmission. For example, WCD 104 may receive third and fourth redundant scheduling assignments 216, which are part of scheduling assignment cycle 210, and associated with a second data transmission pattern 212. The first wireless device WCD 104 may use one or more of the third and fourth redundant scheduling assignments 216 to detect data 218. In some embodiments, the first data transmission 208 and second scheduling cycle 210 may overlap in time.

In some embodiments, a wireless device, such as WCD 104, compares the received scheduling assignments and determines whether received scheduling assignments are contradictory (e.g., provide contradictory or conflicting information or indications). If it is determined that two or more scheduling assignments referring to the same data are not contradictory, the wireless device may detect the data using either of the received redundant scheduling assignments. However, if it is determined that two or more of the scheduling assignments are contradictory, the wireless device may ignore the data transmission. In some embodiments, the wireless device may detect the data using the most recent scheduling assignment if two or more assignments are contradictory.

In some embodiments, the resources for discovery in multiple cells and/or the resources for multiple scheduling assignment transmission may be signalled to a wireless device, such as WCD 102, that is intending to transmit scheduling assignments for data communication. Such signalling may, for example, be provided by the network. For instance, it may be provided by a radio node 106, such as a base station. In some cases, this signalling may occur at the device's connection to the network, and prior to data transmission. In some embodiments, the WCD may be able to obtain authorization from the network to begin a communication session as well as information about the transmission resources.

Figure 6:
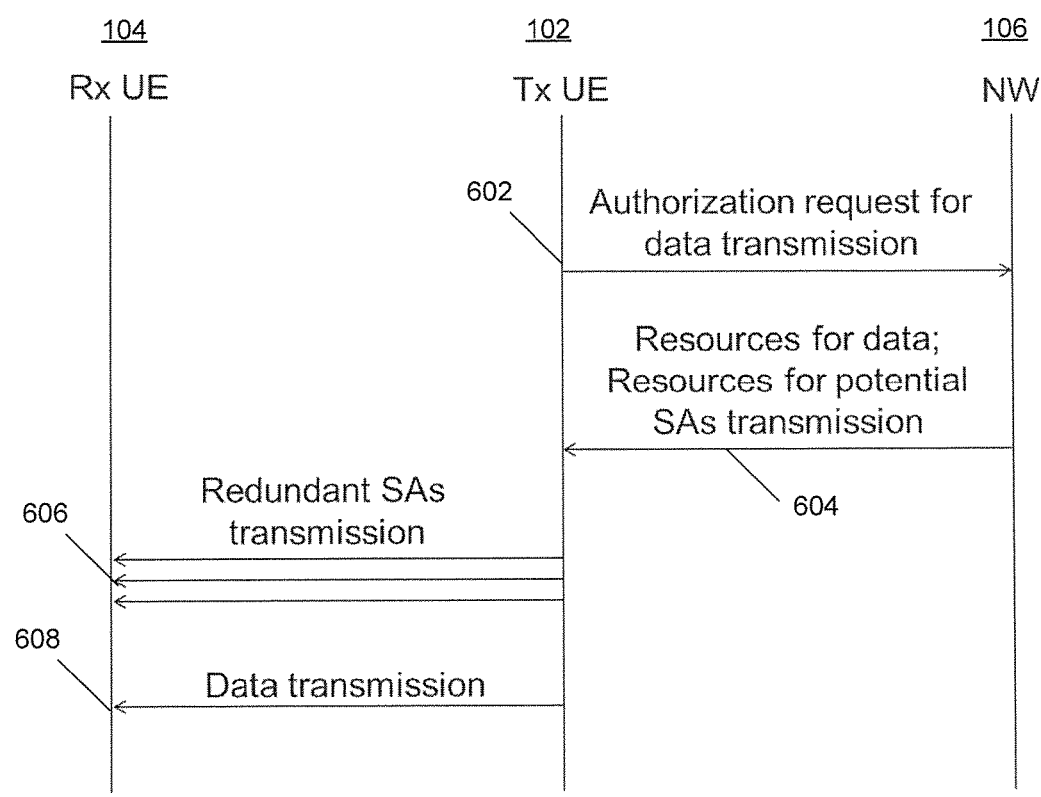
FIG. 6 is a signal diagram for direct communications in accordance with exemplary embodiments.

Referring now to FIG. 6, according to some embodiments, the redundant transmission of scheduling assignments 606 and data transmission 608 may follow an authorization and/or identification process 602,604. For instance a transmitting WCD 102 may request 602 authorization for data transmission from a network, such as a radio node 106 of network 100. The request may also (or alternatively) contain a request for information regarding the resources for data and potential redundant scheduling assignment transmission. The network may then provide information 604 to the transmitting WCD 102 about the resources to use for the transmission of data and/or scheduling assignments. The WCD 102 may then transmit redundant scheduling assignments and data directly to a second device, such as WCD 104. This process may occur, for instance, as outlined in FIG. 3.

In some embodiments, the radio node 106 may be a base station, such as an eNodeB. The eNodeB may communicate with other nodes in its proximity in order to acquire resources for discovery and scheduling assignment transmission on at least some cells in proximity. According some embodiments, the signals communicated to the WCD 102, for instance in 604 of FIG. 6, are based on the information collected from the nodes in its proximity.

One of ordinary skill will recognize that different levels of freedom in the WCD (102,104) implementations disclosed herein are possible. For example, even though any signalling associated with the scheduling assignment format, as well as WCD-network signalling, may need to be standardized, a level of freedom may still be afforded to WCD behaviour. For instance, it may not be fully specified whether (and when) a WCD 102 should transmit one or multiple redundant scheduling assignments for the same data transmission. It may also be possible that the network, such as radio node 106, signals to the WCD 102 which resources may be used for scheduling assignment transmission, leaving to the WCD 102 the freedom to use one or all of them according to the techniques disclosed herein.

Figure 7:
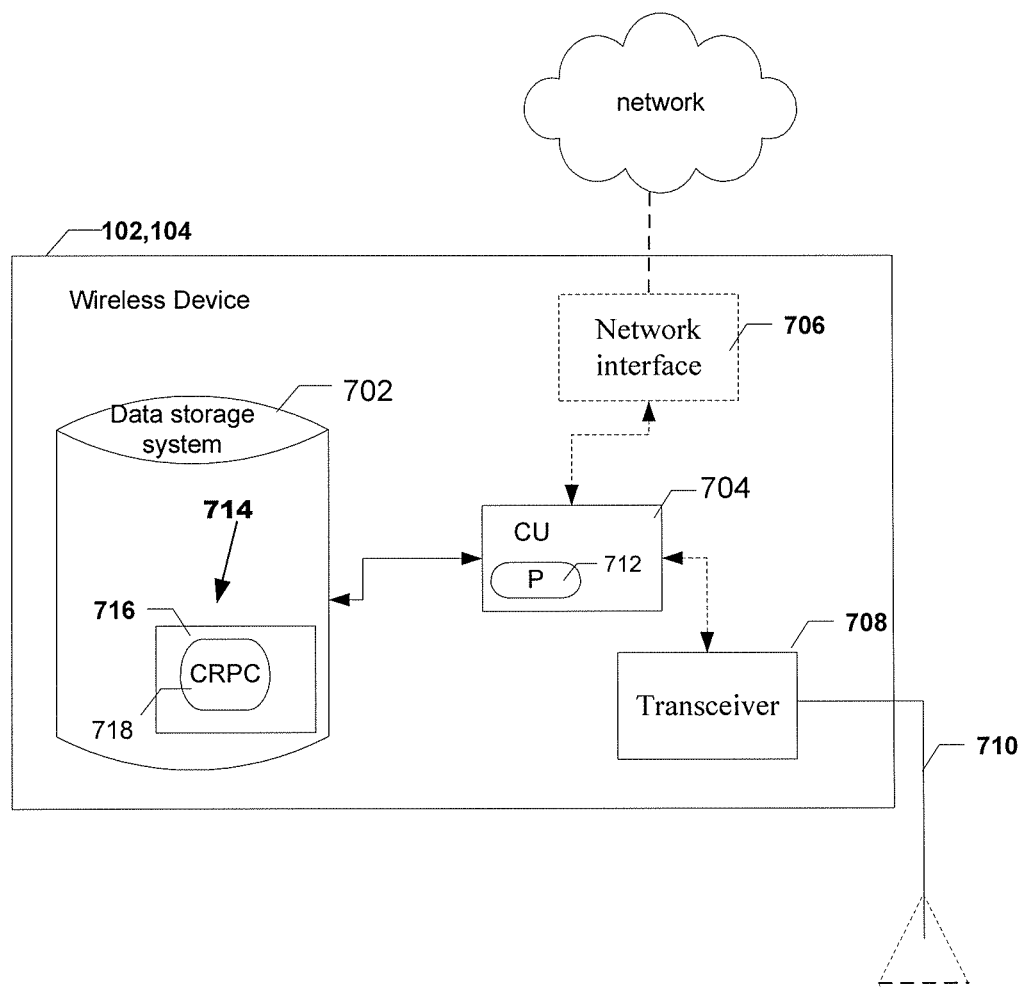
FIG. 7 is a block diagram of a wireless device in accordance with exemplary embodiments.

FIG. 7 illustrates a block diagram of an example wireless device, such as WCD 102 or 104. In the embodiment shown in FIG. 7, wireless device 102 includes: control unit (CU) 704 (e.g., a data processing system), which may include one or more processors (P) 712 (e.g., microprocessors) and/or one or more circuits, such as an application specific integrated circuit (ASIC), Field-programmable gate arrays (FPGAs), etc.; an optional network interface 706 for connecting the wireless device to network 100 and/or radio node 106; a transceiver 708 coupled to an antenna 710 for wireless communicating with, for example, one or more network nodes (e.g. WCD 104 or radio node 106); a data storage system 702, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where control unit 704 includes a processor 712 (e.g., a microprocessor), a computer program product 714 may be provided, which computer program product includes: computer readable program code 718 (e.g., instructions), which implements a computer program, stored on a computer readable medium 716 of data storage system 702, such as, but not limited to magnetic media (e.g., a hard disk), optical media (e.g., a DVD), memory devices (e.g., random access memory), etc. In some embodiments, computer readable program code 718 is configured such that, when executed by control unit 704, code 718 causes the control unit 704 to perform steps described herein (e.g., steps shown in FIGS. 3, 5, and/or 6).

In some embodiments, the wireless device is configured to perform steps described above without the need for code 718. For example, control unit 704 may consist merely of specialized hardware, such as one or more application-specific integrated circuits (ASICs). Hence, the features of the present invention described above may be implemented in hardware and/or software. For example, in some embodiments, the functional components of the wireless device described above may be implemented by control unit 704 executing program code 718, by control unit 704 operating independent of any computer program code 718, or by any suitable combination of hardware and/or software.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for direct communication between wireless devices, the method comprising:

transmitting, directly from a first wireless device to a second wireless device, a first scheduling cycle; and transmitting, directly from said first wireless device to said second wireless device, a first set of data to be detected by said second wireless device, wherein said first scheduling cycle includes a plurality of redundant scheduling assignments, each of the plurality of redundant scheduling assignments indicating, to said second wireless device, said first set of data, and wherein the second wireless device is configured to:

determine whether a first redundant scheduling assignment and a second redundant scheduling assignment of the plurality of redundant scheduling assignments are contradictory, and detect said first set of data, received from said first wireless device, using one or more of the first redundant scheduling assignment and the second redundant scheduling assignment as a result of a determination that the first redundant scheduling assignment and the second redundant scheduling assignment are not contradictory.

2. The method of claim 1, further comprising:

transmitting, directly from said first wireless device to said second wireless device, a second scheduling cycle; and transmitting, directly from said first wireless device to said second wireless device, a second set of data, wherein said second scheduling cycle includes a plurality of redundant scheduling assignments, each of the plurality of redundant scheduling assignments of the second scheduling cycle indicating, to said second wireless device, said second set of data.

3. The method of claim 2, wherein the transmission of said second scheduling cycle overlaps in time with the transmission of said first set of data.

4. The method of claim 1, wherein one or more redundant scheduling assignments of said plurality of redundant scheduling assignments indicates at least one of:

an identity of the first wireless device, an identity of the second wireless device, and content of said first set of data.

5. The method of claim 1, wherein one or more redundant scheduling assignments of said plurality of redundant scheduling assignments includes a pointer to a spectrum resource of said transmitted first set of data.

6. The method of claim 1, wherein one or more redundant scheduling assignments of said plurality of redundant scheduling assignments is offset by a predetermined time offset or a frequency offset relative to said transmitted first set of data.

7. The method of claim 1, wherein a time or a frequency position of a spectrum resource of said transmitted first set of data is indicated by a time or a frequency position of one or more redundant scheduling assignments of said plurality of redundant scheduling assignments.

8. The method of claim 1, wherein a time or a frequency position of a spectrum resource of said transmitted first set of data is indicated by a retransmission index of at least one of said plurality of redundant scheduling assignments.

9. The method of claim 7, wherein said time or said frequency position of said spectrum resource is indicated according to a predetermined rule known to both said first wireless device and said second wireless device.

10. The method of claim 1, wherein each of said plurality of redundant scheduling assignments of said first scheduling cycle is independently sufficient to enable said second wireless device to detect said first set of data.

11. The method of claim 1, wherein each of said plurality of redundant scheduling assignments of said first scheduling cycle has the same payload.

12. The method of claim 1, further comprising:
determining, at said first wireless device, a plurality of candidate redundant scheduling assignments,
wherein transmitting said first scheduling cycle includes sending only a subset of said plurality of candidate redundant scheduling assignments.

13. The method of claim 1, wherein one or more redundant scheduling assignments of said plurality of redundant scheduling assignments identifies at least one of: a pattern of said first set of data, a format of said first set of data, a frequency of said first set of data, and a size of said first set of data.

14. The method of claim 2, wherein said first scheduling cycle contains more redundant scheduling assignments than said second scheduling cycle.

15. The method of claim 1, further comprising:
receiving, at said first wireless device from a radio node, a signal identifying resources to use for transmitting said first scheduling cycle.

16. The method of claim 1, further comprising:
transmitting, from said first wireless device to a radio node, a request for authorization to transmit said first scheduling cycle; and
receiving, at said first wireless device from said radio node, an authorization signal in response to said request,
wherein said transmitting said first scheduling cycle is in response to said receiving said authorization signal.

17. A method for detecting information communicated directly between wireless devices, the method comprising:
receiving, at a first wireless device from a second wireless device, a first redundant scheduling assignment;
receiving, at said first wireless device from said second wireless device, a second redundant scheduling assignment, wherein said first and second redundant scheduling assignments are each associated with a data transmission from said second wireless device;
determining whether the first redundant scheduling assignment and the second redundant scheduling assignment are contradictory; and
as a result of determining that the first redundant scheduling assignment and the second redundant scheduling assignment are not contradictory, detecting, at said first wireless device, a set of data from said data transmission using one or more of the first redundant scheduling assignment and the second redundant scheduling assignment.

18. The method of claim 17, wherein said second redundant scheduling assignment is received after said first redundant scheduling assignment, and said second redundant scheduling assignment is used to detect said set of data.

19. The method of claim 17, further comprising:
receiving, at said first wireless device from said second wireless device, a third redundant scheduling assignment; and
receiving, at said first wireless device from said second wireless device, a fourth redundant scheduling assignment,
wherein said third and fourth redundant scheduling assignments are each associated with a second data transmission from said second wireless device.

20. The method of claim 19, further comprising:
detecting, at said first wireless device, a second set of data from said second data transmission using said third or fourth redundant scheduling assignment.

21. The method of claim 19, further comprising:
determining, at said first wireless device, whether said third and fourth redundant scheduling assignments are contradictory; and
if it is determined that said third and fourth redundant scheduling assignments are not contradictory, detecting, at said first wireless device, a second set of data from said second data transmission using said third or fourth redundant scheduling assignment, and
if it is determined that said third and fourth redundant scheduling assignments are contradictory, ignoring said second data transmission.

22. The method of claim 17, wherein one or more of said first and second redundant scheduling assignments indicates at least one of: an identity of the first wireless device, an identity of the second wireless device, and content of said set of data.

23. The method of claim 17, wherein one or more of said first and second redundant scheduling assignments includes a pointer to a spectrum resource of said data transmission.

24. The method of claim 17, wherein one or more of said first and second redundant scheduling assignments is offset by a predetermined time offset or a frequency offset relative to said data transmission.

25. The method of claim 17, wherein a time or a frequency position of a spectrum resource of said data transmission is indicated by a time or a frequency position of one or more of said first and second redundant scheduling assignments.

26. The method of claim 17, wherein a time or a frequency position of a spectrum resource of said data transmission is indicated by a retransmission index of at least one of said first and second redundant scheduling assignments.

27. The method of claim 25, wherein said time or said frequency position of said spectrum resource is indicated according to a predetermined rule known to both said first wireless device and said second wireless device.

28. The method of claim 17, wherein both said first and second redundant scheduling assignments are independently sufficient to enable said first wireless device to detect said set of data.

29. The method of claim 17, wherein one or more of said first and second redundant scheduling assignments identifies at least one of: a pattern of said set of data, a format of said set of data, a frequency of said set of data, and a size of said set of data.

30. A wireless device comprising a processor and a memory, said memory containing instructions executable by said processor, wherein said wireless device is operative to:

transmit, directly to a second wireless device, a first scheduling cycle; and transmit, directly to said second wireless device, a first set of data to be detected by said second wireless device, wherein said first scheduling cycle includes a plurality of redundant scheduling assignments, each of the plurality of redundant scheduling assignments indicating, to said second wireless device, said first set of data, and wherein the second wireless device is configured to:
determine whether a first redundant scheduling assignment and a second redundant scheduling assignment of the plurality of redundant scheduling assignments are contradictory, and detect said first set of data, received from said wireless device, using one or more of the first redundant scheduling assignment and the second redundant scheduling assignment as a result of a determination that the first redundant scheduling assignment and the second redundant scheduling assignment are not contradictory.

31. The wireless device of claim 30, further operative to:
transmit, directly to said second wireless device, a second scheduling cycle; and
transmit, directly to said second wireless device, a second set of data,
wherein said second scheduling cycle includes a plurality of redundant scheduling assignments, each of the plurality of redundant scheduling assignments of the second scheduling cycle indicating, to said second wireless device, said second set of data.

32. The wireless device of claim 31, wherein the transmission of said second scheduling cycle overlaps in time with the transmission of said first set of data.

33. The wireless device of claim 30, wherein one or more redundant scheduling assignments of said plurality of redundant scheduling assignments indicates at least one of: an identity of the wireless device, an identity of the second wireless device, and content of said first set of data.

34. The wireless device of claim 30, wherein one or more redundant scheduling assignments of said plurality of redundant scheduling assignments includes a pointer to a spectrum resource of said transmitted first set of data.

35. The wireless device of claim 30, wherein one or more redundant scheduling assignments of said plurality of redundant scheduling assignments is offset by a predetermined time offset or a frequency offset relative to said transmitted first set of data.

36. The wireless device of claim 30, wherein a time or a frequency position of a spectrum resource of said transmitted first set of data is indicated by a time or a frequency position of one or more redundant scheduling assignments of said plurality of redundant scheduling assignments.

37. The wireless device of claim 30, wherein a time or a frequency position of a spectrum resource of said transmitted first set of data is indicated by a retransmission index of at least one of said plurality of redundant scheduling assignments.

38. The wireless device of claim 36, wherein said time or said frequency position of said spectrum resource is indicated according to a predetermined rule known to both said wireless device and said second wireless device.

39. The wireless device of claim 30, wherein each of said plurality of redundant scheduling assignments of said first scheduling cycle is independently sufficient to enable said second wireless device to detect said first set of data.

40. The wireless device of claim 30, wherein each of said plurality of redundant scheduling assignments of said first scheduling cycle has the same payload.

41. The wireless device of claim 30, further operable to:
determine a plurality of candidate redundant scheduling assignments,
wherein transmitting said first scheduling cycle includes sending only a subset of said plurality of candidate redundant scheduling assignments.

42. The wireless device of claim 30, wherein one or more redundant scheduling assignments of said plurality of redundant scheduling assignments identifies at least one of: a pattern of said first set of data, a format of said first set of data, a frequency of said first set of data, and a size of said first set of data.

43. The wireless device of claim 31, wherein said first scheduling cycle contains more redundant scheduling assignments than said second scheduling cycle.

44. The wireless device of claim 30, further operable to:
receive, from a radio node, a signal identifying resources to use for transmitting said first scheduling cycle.

45. The wireless device of claim 30, further operable to:
transmit, to a radio node, a request for authorization to transmit said first scheduling cycle; and
receive, from said radio node, an authorization signal in response to said request,
wherein said transmitting said first scheduling cycle is in response to said receiving said authorization signal.

46. A wireless device comprising a processor and a memory, said memory containing instructions executable by said processor, wherein said wireless device is operable to:
receive, from a second wireless device, a first redundant scheduling assignment;
receive, from said second wireless device, a second redundant scheduling assignment,
wherein said first and second redundant scheduling assignments are each associated with a data transmission from said second wireless device;
determine whether the first redundant scheduling assignment and the second redundant scheduling assignment are contradictory; and
as a result of determining that the first redundant scheduling assignment and the second redundant scheduling assignment are not contradictory, detect a set of data from said data transmission using one or more of the first redundant scheduling assignment and the second redundant scheduling assignment.

47. The wireless device of claim 46, wherein said second redundant scheduling assignment is received after said first redundant scheduling assignment, and said second redundant scheduling assignment is used to detect said set of data.

48. The wireless device of claim 46, further operable to:
receive, from said second wireless device, a third redundant scheduling assignment; and
receive, from said second wireless device, a fourth redundant scheduling assignment,
wherein said third and fourth redundant scheduling assignments are each associated with a second data transmission from said second wireless device.

49. The wireless device of claim 48, further operable to:
detect a second set of data from said second data transmission using said third or fourth redundant scheduling assignment.

50. The wireless device of claim 48, further operable to:
determine whether said third and fourth redundant scheduling assignments are contradictory; and if it is determined that said third and fourth redundant scheduling assignments are not contradictory, detect a second set of data from said second data transmission using said third or fourth redundant scheduling assignment, and if it is determined that said third and fourth redundant scheduling assignments are contradictory, ignore said second data transmission.

51. The wireless device of claim 46, wherein one or more of said first and second redundant scheduling assignments indicates at least one of: an identity of the wireless device, an identity of the second wireless device, and content of said set of data.

52. The wireless device of claim 46, wherein one or more of said first and second redundant scheduling assignments includes a pointer to a spectrum resource of said data transmission.

53. The wireless device of claim 46, wherein one or more of said first and second redundant scheduling assignments is offset by a predetermined time offset or a frequency offset relative to said data transmission.

54. The wireless device of claim 46, wherein a time or a frequency position of a spectrum resource of said data transmission is indicated by a time or a frequency position of one or more of said first and second redundant scheduling assignments.

55. The wireless device of claim 46, wherein a time or a frequency position of a spectrum resource of said data transmission is indicated by a retransmission index of at least one of said first and second redundant scheduling assignments.

56. The wireless device of claim 54, wherein said time or said frequency position of said spectrum resource is indicated according to a predetermined rule known to both said wireless device and said second wireless device.

57. The wireless device of claim 46, wherein both said first and second redundant scheduling assignments are independently sufficient to enable said wireless device to detect said set of data.

58. The wireless device of claim 46, wherein one or more of said first and second redundant scheduling assignments identifies at least one of: a pattern of said set of data, a format of said set of data, a frequency of said set of data, and a size of said set of data.

59. A computer program product comprising computer readable program code on a non-transitory computer readable medium, said computer readable program code executable by a processor to cause a wireless device to:

transmit, directly to a second wireless device, a first scheduling cycle; and transmit, directly to said second wireless device, a first set of data to be detected by said second wireless device, wherein said first scheduling cycle includes a plurality of redundant scheduling assignments, each of the plurality of redundant scheduling assignments indicating, to said second wireless device, said first set of data, and wherein the second wireless device is configured to:

determine whether a first redundant scheduling assignment and a second redundant scheduling assignment of the plurality of redundant scheduling assignments are contradictory, and detect said first set of data, received from said wireless device, using one or more of the first redundant scheduling assignment and the second redundant scheduling assignment as a result of a determination that the first redundant scheduling assignment and the second redundant scheduling assignment are not contradictory.

* * * * *